US012014093B2

(12) United States Patent
Smith et al.

(10) Patent No.: US 12,014,093 B2
(45) Date of Patent: Jun. 18, 2024

(54) COMMUNICATION ARCHITECTURE PROMOTING COMPATIBILITY WITH PRINTING FINISHING EQUIPMENT (71) Applicant: Xerox Corporation, Norwalk, CT (US)

(72) Inventors: Bruce H. Smith, Webster, NY (US); Carol-Lynn Vidjan, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/938,105

(22) Filed: Oct. 5, 2022

(65) Prior Publication Data

US 2024/0118843 A1    Apr. 11, 2024

(51) Int. Cl.
*G06F 3/12* (2006.01)

(52) U.S. Cl.
CPC ............ *G06F 3/121* (2013.01); *G06F 3/126* (2013.01)

(58) Field of Classification Search
CPC ........................ G06F 3/121; H04N 1/00127; H04N 1/00639; H04N 1/00132; H04N 1/00137
USPC ................................................ 358/1.15, 1.14
See application file for complete search history.

(56) References Cited

U.S. PATENT DOCUMENTS

| | | | |
|---|---|---|---|
| 5,694,634 A | 12/1997 | Patton et al. | |
| 7,593,125 B2 | 9/2009 | Wang et al. | |
| 7,711,281 B2 | 5/2010 | Hamano et al. | |
| 8,537,401 B2 | 9/2013 | Shah | |
| 10,120,629 B2 | 11/2018 | Terashita | |
| 2006/0238786 A1* | 10/2006 | Sakura | G06F 3/1205 358/1.9 |
| 2009/0141301 A1* | 6/2009 | Cornelissen | G03G 15/502 358/1.14 |
| 2009/0251721 A1* | 10/2009 | Knodt | G06F 3/1285 358/1.15 |
| 2010/0214598 A1 | 8/2010 | Hoppenot et al. | |
| 2010/0238484 A1 | 9/2010 | Komine | |
| 2010/0322692 A1* | 12/2010 | Iguchi | B26F 1/02 399/407 |
| 2015/0022845 A1* | 1/2015 | Roscoe | G06F 3/1234 358/1.14 |

* cited by examiner

*Primary Examiner* — Jamares Q Washington
(74) *Attorney, Agent, or Firm* — Gibb IP Law Firm, LLC (57) ABSTRACT A print job is processed to produce printed output using a printing component of a device. An input/output device (of the device) is controlled by a processor of the device to output signals to finishing equipment. Such finishing equipment is adapted to manipulate the printed output. The processor of the device causes the signals to include an initial signal indicating the start of a data transfer and subsequent signals following the initial signal. The signals can be in industry-standard format or a format compatible with the finishing device.

20 Claims, 4 Drawing Sheets

COMMUNICATION ARCHITECTURE PROMOTING COMPATIBILITY WITH PRINTING FINISHING EQUIPMENT

BACKGROUND

Systems and methods herein generally relate to printing system communication architectures and, more particularly, to architectures enabling print job and finishing information to be provided to connected feeding and finishing devices.

The value of printed products is greatly enhanced by finishing operations that are applied post-printing. Finishing operations can include, for example, cutting operations that transform a printed object into a unique size/shape, surface altering operations that apply protective and/or decorative finishes to the printed sheets, binding operations that join multiple sheets together into books, booklets, etc., hole punching operations that make printed products easily usable with various holding devices such as binders, etc., perforation operations that allow printed products to be easily folded and/or separated from one another, etc., stapling or other joining operations, etc.

SUMMARY

Various methods herein process a print job to produce printed output using a printing component of a device. Such methods control an input/output device of the device to output signals to finishing equipment. Such finishing equipment is adapted to manipulate the printed output. In such methods, a processor of the device causes the signals to include an initial signal indicating the start of a data transfer and subsequent signals following the initial signal. With these methods, the signals can be in an industry-standard format or a format compatible with the finishing device.

Further, these methods can cause (using the processor) the signals to be data of sheet dimensions, an initial sheet speed, a revised sheet speed, data of printing faults, etc. Additionally, these methods can receive data from the finishing equipment using the input/output device including data from the finishing equipment indicating the finishing equipment's status, finishing equipment faults, etc.

Systems herein include (among other components) a printing device and an input/output device operatively connected to a computer processor. The processor is adapted to control the printing device to process a print job to produce printed output. The processor is adapted to control the input/output device to output signals to finishing equipment. The finishing equipment can be, for example, stackers, staplers, sorters, and binding equipment, and such equipment is adapted to manipulate the printed output. The processor is adapted to cause such signals to be in industry-standard format or a format compatible with the finishing device. The processor is adapted to cause the signals to include an initial signal indicating the start of a data transfer and subsequent signals following the initial signal. Such subsequent signals can be, for example, data of sheet dimensions, sheet speed, revised sheet speed, printing faults.

Also, the input/output device is adapted to receive data from the finishing equipment, and such received data can include the finishing equipment's status, finishing equipment faults, etc.

These and other features are described in, or are apparent from, the following detailed description.

BRIEF DESCRIPTION OF THE DRAWINGS

Various exemplary systems and methods are described in detail below, with reference to the attached drawings, in which.

DETAILED DESCRIPTION

As mentioned above, the value of printed products is enhanced by finishing operations that are applied post-printing. Because of this, sophisticated printing shops maintain a variety of different types of finishing equipment.

One issue that exists is that there is limited communication between the printing devices and the finishing devices. For example, printers made by one manufacturer sometimes cannot communicate with finishing equipment made by a different manufacturer. In some situations, the communication between printers and finishing equipment is limited to binary methods that only allow for limited information on sheets and sets of sheets. This can require individuals or automated systems to supply the printing details to the printer and separately supply complex finishing operation details to the finishing equipment.

Therefore, the systems and methods herein provide printing system communication architectures that enable job and sheet specific information to third party connected feeding and finishing solutions. As used herein "third-party" means a different manufacturer from the manufacturer of the printing device. In some examples, the devices and methods herein provide steady high and low signals using one channel to indicate the start of data transfer and use other channels to transmit pulses representing data.

As noted above, in some systems binary statuses are communicated between third party feeding and finishing devices; however, these allow only a limited set of sheet and set information to be communicated between the printer and the third-party equipment, and the process of sharing data between items provided by different manufacturers can be very complicated. Therefore, rather than utilizing a limited number (e.g., 8) binary commands and binary statuses, the devices and methods herein enable an interface with the full job feeding and finishing capabilities and job specific requirements.

Some of the information that can be shared using the devices and method herein includes: the default speed of the sheets (e.g., in sheet distance travel/time unit, number of sheets/time unit, etc.); a minimum speed a specific speed for a specific sheet or group of sheets, etc; and paper properties (length, width, & weight). Job start and job stop indications can also be included in the data transmitted to the finishing devices.

The finishing options/properties are also communicated between the printing devices and finishing devices. Such finishing options can include, for example, stapling, folding, cutting, slitting, perforating, punching, binding, bleed trim, face trim, creasing, rotation, laminate, coating, integrity checking, etc. Each of these finishing options have specific properties that are shared with the finisher. Additionally, the two-way communication systems herein allow finishing devices to share status fault codes, jam clearance information, request pause time, etc.

The communication connection between the printing devices can be wired or wireless. Wired connections can include, for example, OPTO, RS422, Can-Bus, USB3.0, etc., or any other useful connection protocol. With devices and methods herein, this physical connection (physical layer) is used to adjust information that is shared dynamically, based on finisher configuration.

Thus, the methods and devices herein provide the user with a single point user interface for supplying all print and finishing details, which is more time efficient and reduces errors from human interaction, relative to an operator separately interacting with a printer user interface and a separate finisher user interface(s). Also, users can supply printer and finishing information when establishing the print file (e.g., PDF, JPEG, etc.) and/or print job thereby further simplifying and reducing user interaction with multiple interfaces.

Figure 1:
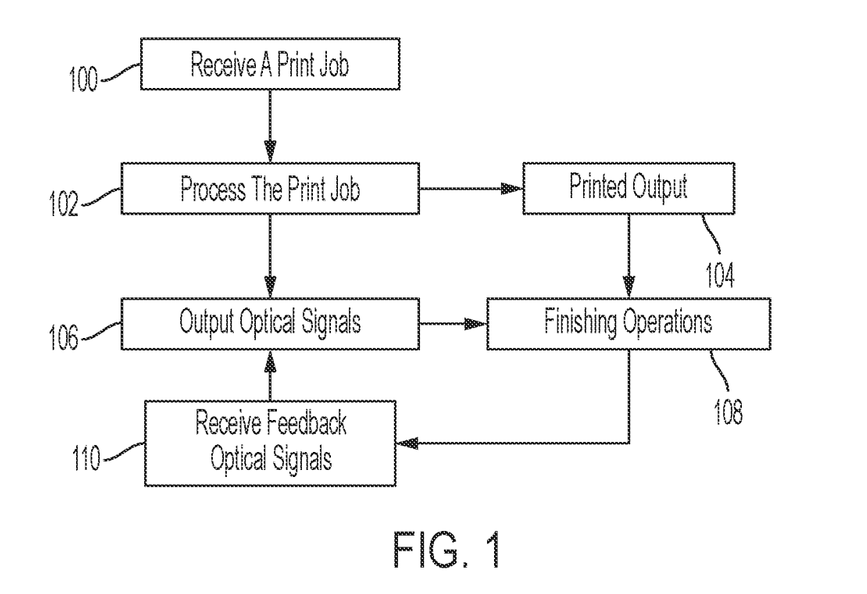
FIG. 1 is a flow diagram of various methods herein.

FIG. 1 is flowchart illustrating exemplary methods herein. In item 100, these methods receive a print job that includes finishing instructions into a system. In item 102, these methods process the print job to produce printed output 104 using a printing component of the system. As shown in item 106, such methods control an input/output device of the system to output signals from the printing device to finishing equipment that performs finishing operations 108. Such finishing equipment is adapted to manipulate the printed output from item 104 to perform the finishing operations 108.

In item 106, a processor of the system can cause the signals to include an initial signal indicating the start of data transfer and subsequent signals following the initial signal. With these methods, in item 106, the signals are caused (using the processor) to be in industry-standard format or a format compatible with the finishing device by the processor. Further, as shown in item 106, these methods can cause (using the processor) the signals to be data of sheet dimensions, the initial sheet speed, a revised sheet speed, data of printing faults, etc.

Additionally, as shown in item 110, these methods can receive data from the finishing equipment (using the input/output device) including data indicating the finishing equipment's status, finishing equipment faults, etc. The processing loop shown by items 106, 108, 110 in FIG. 1 illustrates the iterative nature of the two-way communication processing that occurs between the printing devices and the finishing devices. In such processing, initial signals can be provided to the finishing equipment 106 and the finishing equipment can respond 110, after which subsequent signals can be supplied in response to the finishing equipment 106. This iterative processing allows the methods and devices herein to establish the communication logic that will be utilized, to provide finishing instructions and data to the finishing devices, to direct feedback from the finishing devices to the printing devices continuously during the ongoing printing and finishing operations, etc.

The methods and devices herein provide enhanced two-way data communications between devices that would not otherwise be capable of performing anything other than basic start/stop or similar data communications. As alluded to above, document processing machines provided by different manufacturers often communicate using different communication logic. Therefore, the same series of signals can mean two different things to different document processing devices from different manufacturers (or such signals may be meaningful to only one of the devices). For ease of terminology, non-compatable document processing machines from different manufacturers are sometimes referred to herein as "communication-incompatible components" because such devices sometimes rely upon logically different communication systems and formats.

To enhance communications between such communication-incompatible components, the methods and systems herein provide a number of features. In one aspect, these methods and systems can initially provide an inquiry (e.g., in item 106 in FIG. 1) from the printing equipment to the finishing equipment that asks the finishing equipment which communication protocols/formats the finishing equipment is capable of understanding. The response provided from the finishing equipment (e.g., in item 110 in FIG. 1) helps the printing equipment establish a finisher-specific communication format (for the currently connected finishing device) that will allow commands and feedback data to be easily transferred between the printing device and the finishing component.

In other examples, with these methods and systems, the printing device can obtain the make/model of the finishing equipment (e.g., in item 110 in FIG. 1) and refer to a database accessible to the printing device for determining the finisher-specific communication format to use when interacting with that specific finishing device. Also, with these methods and systems, users can manually identify the make/model of the finishing equipment and/or identify the finisher-specific communication format that should be utilized (through the user interface of the printing device). In some examples, the finisher-specific communication format can be proprietary to a specific manufacturer, while in other examples the finisher-specific communication format can be a generic format recognizable/usable by most printing and finishing equipment.

This allows the printing device to provide all necessary data and instructions to the finishing devices in item 106, avoiding the need for a user to manually enter commands/instructions on the finishing devices user interface. Additionally, such feedback communication allows fault information, jam information, etc., to be easily communicated between the various devices.

Additionally, the printing device can improve efficiency by requesting the finishing device to start up (e.g., warm up or wake from any sleep state) before the printed output sheets actually reach the finishing device. Any such advanced activation command can be provided from the printing device to the finishing device in a time range that allows the finishing device to be fully operational when the printed output reaches the finishing device, without wasting energy by requiring the finishing device to remain idle in a fully powered state an extensive amount of time.

The feedback from the finishing devices to the printing devices afforded by these methods and systems (e.g., in item 110 in FIG. 1) can cause the finishing devices to slow down or speed up the printing rate (output rate) of the printing device (depending upon the devices capabilities) to permit the printing/finishing devices to operate in the most efficient manner possible. This avoids having the finishing device wait for printed output and also reduces excessive queuing of printed sheets waiting to be processed by the finishing devices. Thus, this feedback can allow one or more of the devices to potentially run at a lower power (or a power saving mode) operational speed so long as the finishing equipment is not idle waiting to receive sheets.

Thus, this two-way communication (e.g., in items 106, 110 in FIG. 1) allows the processing speed of the printing device and the finishing devices to be adjusted dynamically as the printing and finishing operations are being performed (simultaneously while printing/finishing is occurring). This can be useful mid-print job when certain printed sheets require additional processing time. For example, additional printing processing time can be needed for mid-job sheets that have increased toner densities, mid-job sheets printed in color versus other monochrome printed job portions, mid-job sheets duplex printed relative to other simplex printed sheets of the job, periodic machine overheating/overloading conditions that require the machine to temporarily slow mid-job, etc. Further, machines can be intentionally slowed to achieve overall power consumption goals of a manufacturing facility to, for example, achieve manufacturing facility power balancing, to take advantage of reduced power rates (or avoid peak rate times), etc.

Figure 2:
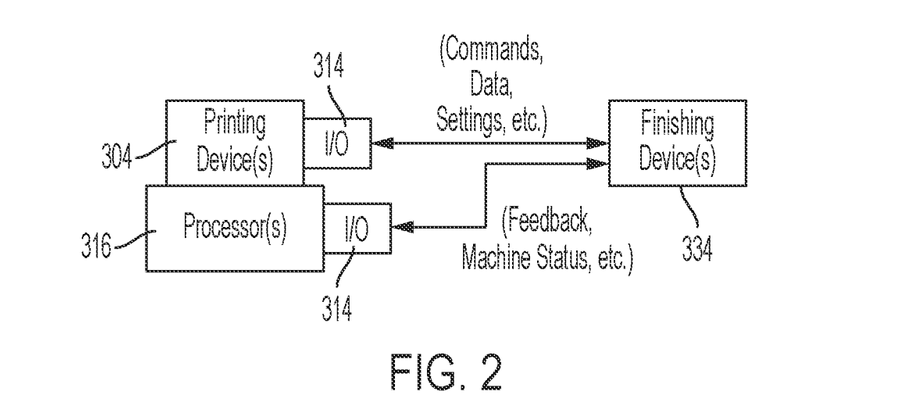
FIG. 2 is a schematic diagram of various systems herein.

As shown in FIG. 2, systems herein include (among other components) a printing device 304, an input/output device (I/O) 314, a computer processor 316, etc. (potentially operatively (directly or indirectly, wired or wireless, etc.) connected to each other). As shown the processor 316 can be separate from, or a component of, the printing device 304 and the two can share an input/output device 314 or each can have its own input/output device 314, depending upon specific implementation.

The processor 316 is adapted to control the printing device 304 to process a print job to produce printed output (104, FIG. 1). The finishing equipment 334 can be, for example, stacker(s), stapler(s), sorter(s), cutter(s), binding equipment, etc., and such equipment is adapted to manipulate the printed output. The finishing equipment 334 can be non-compatable document processing machines relative to the other equipment shown in FIG. 2.

The processor 316 is adapted to control the input/output device 314 to output signals to the finishing equipment 334. Also, the input/output device 314 is adapted to receive data from the finishing equipment 334 and such data can include the finishing equipment's status, finishing equipment faults, etc. The processor 316 can cause such signals to be in an industry-standard format or a format compatible with the finishing device 334.

Some of the information that can be shared between the printing device 304 and the finishing device 334 includes: the default speed of the sheets (e.g., in sheet distance travel/time unit, number of sheets/time unit, etc.); a revised sheet speed; a minimum speed of a specific speed or group of sheets, etc; as well as paper properties (length, width, & weight), etc. Job start and job stop indications can also be included in the data transmitted to the finishing devices.

The finishing options/properties are also communicated between the printing devices 304 and finishing devices 334. Such finishing options can include, for example, stapling, folding, cutting, slitting, perforating, punching, binding, bleed trim, face trim, creasing, rotation, laminate, coating, integrity checking, etc. Each of these finishing options have specific properties that are transmitted from the printing equipment 304 to the finisher 334. Additionally, the two-way communication systems herein allow finishing devices to share status fault codes, jam clearance information, request pause time, etc.

Thus, the processor 316 can cause the signals to include an initial signal indicating the start of a data transfer and subsequent signals following the initial signal. Such signals can be, for example, commands, data, settings, feedback, machine status, etc. (e.g., data of sheet dimensions, sheet speed, revised sheet speed, printing faults, etc.).

Figure 3:
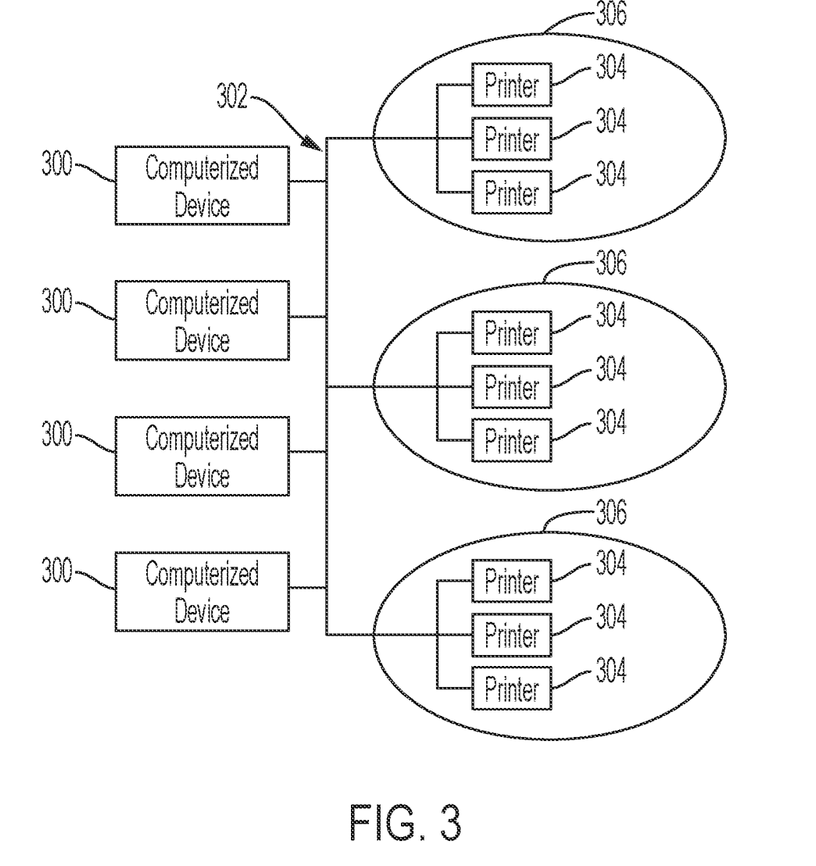
FIG. 3 is a schematic diagram illustrating systems herein.

As shown in FIG. 3, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 4:
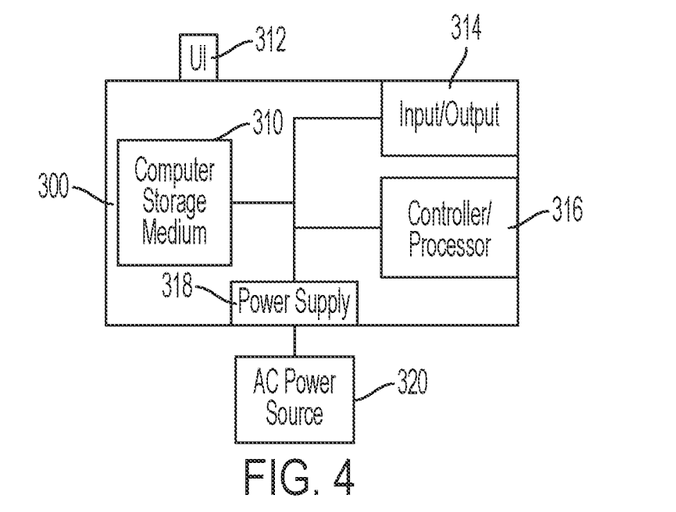
FIG. 4 is a schematic diagram illustrating devices herein.

FIG. 4 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 4, a body housing has one or more functional components that operate on power supplied from an alternating current (AC) source 320 by the power supply 318. The power supply 318 can comprise a common power conversion unit, power storage element (e.g., a battery, etc), etc.

Figure 5:
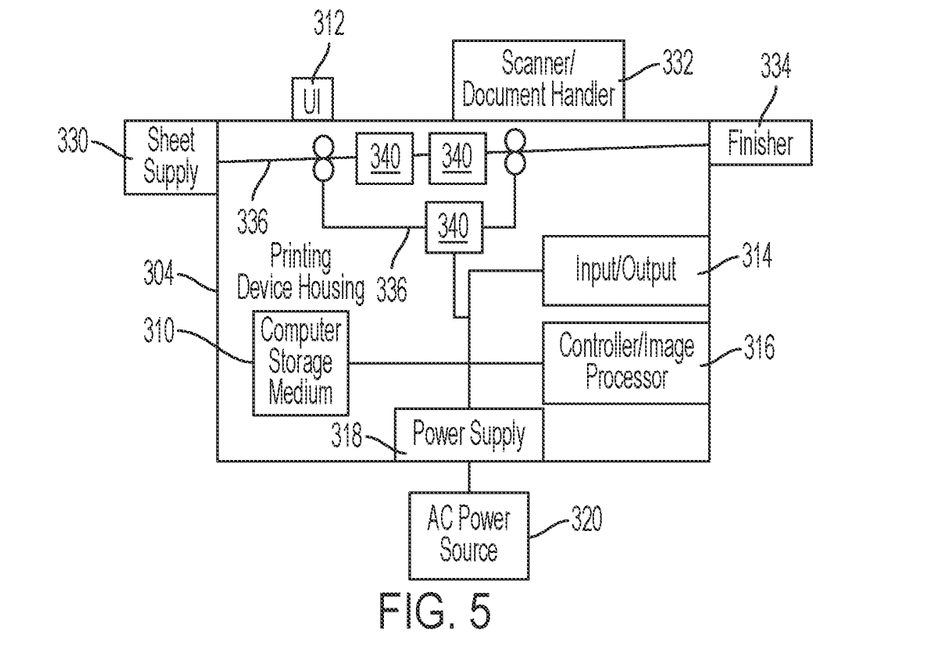
FIG. 5 is a schematic diagram illustrating devices herein.

FIG. 5 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 316 (that is different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

Figure 6:
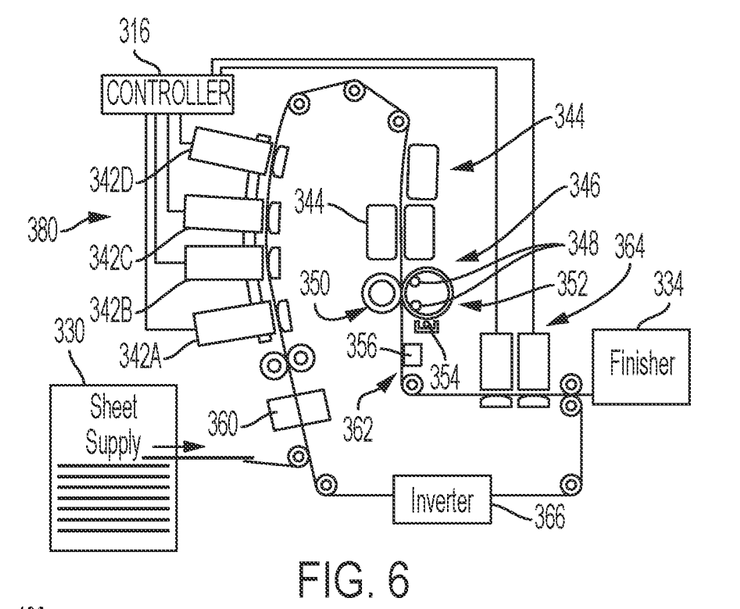
FIG. 6 is a schematic diagram illustrating devices herein.
Figure 7:
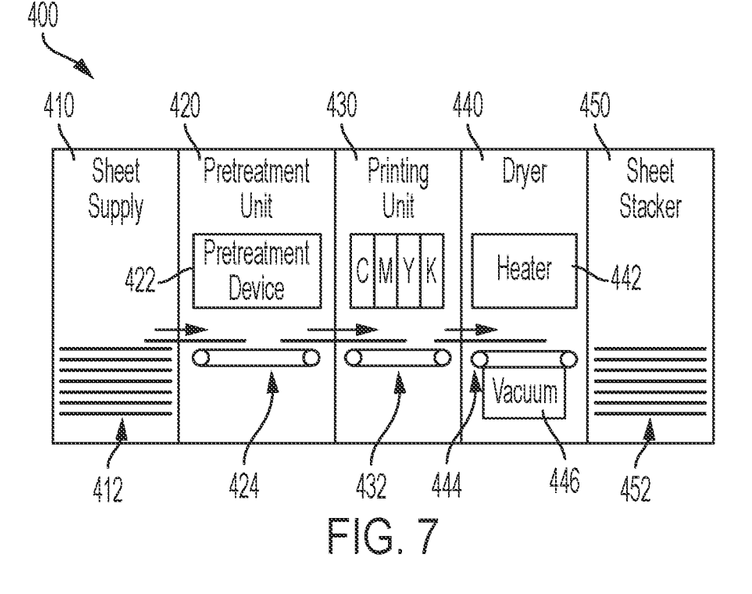
FIG. 7 is a schematic diagram illustrating devices herein.

The one or more printing engines 340 are intended to illustrate any marking device that applies a marking material (toner, inks, etc.) to continuous media or sheets of media, whether currently known or developed in the future and can include, for example, devices that use an ink jet imaging system, as shown in FIG. 6, or a high-speed aqueous imaging system, as shown in FIG. 7.

More specifically, FIG. 6 illustrates one example of the above-mentioned printing engine(s) 380 that is an ink jet imaging system. In this example, the imaging apparatus 380 is in the form of an ink jet printer that employs one or more ink jet printheads, each with an associated solid ink supply (342A-342D). The exemplary direct-to-sheet phase-change ink jet imaging system 380 includes a media supply and handling system 330 configured to supply media (e.g., paper, plastic, or other printable material), a media conditioner 360, printed sheet conditioner 344, coating station 364, and finisher 334.

The media is propelled by a sheet transport 362 that can include a variety of motors rotating one or more rollers. For duplex operations, an inverter 366 may be used to flip the sheet over to present a second side of the media to the printheads 342A-342D.

The media conditioner 360 includes, for example, a pre-heater. The pre-heater brings the media to an initial predetermined temperature that is selected for desired image characteristics corresponding to the type of media being printed as well as the type, colors, and number of inks being used. The pre-heater may use contact, radiant, conductive, or convective heat to bring the media to a target preheat temperature.

The media is transported through a printing station that includes a series of color printheads 342A-342D, each color unit effectively extending across the width of the media and being able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). A controller 316 generates timing signals for actuating the ink jet ejectors in the printheads 342A-342D in synchronization with the passage of the media to enable the four colors to be ejected with a reliable degree of accuracy for registration of the differently colored patterns to form four primary-color images on the media. The ink jet ejectors are actuated by the firing signals to correspond to image data processed by the controller 316 that may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction, such as for spot-color applications and the like.

Each of color printheads 342A-342D may include at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads and is configured to reposition the print bar by sliding the print bar along the cross-process axis of the media web. In alternative embodiments, an actuator system may be used that does not physically move the printheads, but redirects the image data to different ejectors in each head to change head position.

The printer may use liquid ink or "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. As used herein, liquid ink refers to melted solid ink, heated gel ink, or other known forms of ink, such as aqueous inks, ink emulsions, ink suspensions, ink solutions, or the like.

Associated with each color unit is a backing member, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature.

Following the printing zone along the media path are one or more "mid-heaters" 344. A mid-heater 344 may use contact, radiant, conductive, and/or convective heat to control a temperature of the media and particularly to bring the media to a temperature suitable for desired properties when passing through the spreader 346. A fixing assembly in the form of the "spreader" 346 is configured to apply heat and/or pressure to the media to fix the images to the media. The function of the spreader 346 is to take what are essentially droplets, strings of droplets, or lines of ink on the sheet and smear them out by pressure and, in some systems, heat, so that spaces between adjacent drops are filled and image solids become uniform. The spreader 346 may include rollers, such as image-side roller 352 and pressure roller 350, to apply heat and pressure to the media, either of which can include heating elements, such as heating elements 348, to bring the media to a predetermined temperature. The spreader 346 may also include a cleaning/oiling station 354 associated with image-side roller 352. The station 354 cleans and/or applies a layer of some release agent or other material to the roller surface. A coating station 364 applies a clear ink to the printed media to modify the gloss and/or to help protect the printed media from smearing or other environmental degradation following removal from the printer.

Operation and control of the various subsystems, components and functions of the imaging system are performed with the aid of the controller 316. The controller 316 may be implemented with general or specialized programmable processors that execute programmed instructions. The controller 316 may be operatively coupled to the print bar and printhead actuators of color printheads 342A-342D in order to adjust the position of the print bars and printheads along the cross-process axis of the media web. In particular, the controller may be operable to shift one or more, or all, of the color units laterally or transverse to the process direction.

The imaging system may also include an optical imaging system 356 that is configured in a manner similar to that for creating the image to be transferred to the web. The optical imaging system is configured to detect, for example, the presence, intensity, and/or location of ink drops jetted onto the receiving member by the ink jets of the printhead assembly. The imaging system may incorporate a variety of light sources capable of illuminating the printed web sufficient to detect printing errors that may be attributable to a faulty or defective ink jet or printhead. The imaging system 356 further includes an array of light detectors or optical sensors that sense the image reflected from the printed web prior to discharge. The controller 316 analyzes the information from the imaging system 356 to determine, among other things, whether a failure or an ink jet or printhead has occurred. The location of the defective printing element is identified and made available to the maintenance technician during a diagnosis procedure. The controller 316 may also use the data obtained from the imaging system 356 to adjust the registration of the color units such as by moving a color unit or one or more printheads. This image data may also be used for color control.

FIG. 7 illustrates an inkjet or aqueous ink printer system 400 that is one of the printers 304, discussed above. Specifically, FIG. 7 illustrates a high-speed ink jet or aqueous ink image producing machine or printer 400. The printer 400 includes a media supply 410, a pretreatment unit 420, a printing unit 430, a dryer 440, and a sheet stacker 450. The media supply 410 stores a plurality of media sheets 412 for printing by the printer 400.

The pretreatment unit 420 includes at least one pretreatment device 422 and transport belt 424. The pretreatment unit 420 receives the media sheets from the media supply 410 and transports the media sheets in a process direction (block arrows in FIG. 7) through the pretreatment unit 420. The pretreatment device 422 conditions the media sheets and prepares the media sheets for printing in the printing unit 430. The pretreatment unit 420 may include, for example, a coating device that applies a coating to the media sheets, a drying device that dries the media sheets, and/or a heating device that heats the media sheets to a predetermined temperature. In some embodiments, the printer 400 does not include a pretreatment unit 420 and media sheets are fed directly from the media supply 410 to the printing unit 430. In other embodiments, the printer 400 may include more than one pretreatment unit.

The printing unit 430 includes at least one marking unit transport belt 432 that receives the media sheets from the pretreatment unit 420 or the media supply 410 and transports the media sheets through the printing unit 430. The printing unit 430 further includes at least one printhead (labeled CMYK in FIG. 7 to represent the standard cyan, magenta, yellow, and black color printheads; however any color printheads could be used). The printhead (CMYK) ejects aqueous ink onto the media sheets as the media sheets are transported through the printing unit 430. In the illustrated embodiment, the printing unit 430 includes four printheads (CMYK), each of which ejects one of cyan, magenta, yellow, and black ink onto the media sheets. The reader should appreciate, however, that other embodiments include other printhead arrangements, which may include more or fewer printheads, arrays of printheads, etc.

The dryer 440 includes a heater 442 and a vacuum drying belt 444 that receives the media sheets from the printing unit 430. A vacuum plenum 446 connects to a vacuum blower or the plumbing that is connected to a vacuum blower at one side in the cross-process direction. The sheet stacker 450 receives and stacks the printed sheets 452.

While FIGS. 5 and 6 illustrate four marking stations adjacent or in contact with a rotating belt, which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

The print media is then transported by the sheet output transport 336 to output trays or a multi-function finishing station 334 performing different desired actions, such as stapling, hole-punching and C or Z-folding, a modular booklet maker, etc., although those ordinarily skilled in the art would understand that the finisher/output tray 334 could comprise any functional unit.

As would be understood by those ordinarily skilled in the art, the printing devices shown here are only examples and the systems and methods herein are equally applicable to other types of printing devices that may include fewer components or more components. For example, while a limited number of printing engines and paper paths are illustrated, those ordinarily skilled in the art would understand that many more paper paths and additional printing engines could be included within any printing device used with systems and methods herein.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock TX, USA and Apple Computer Co., Cupertino CA, USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A device comprising:
   a computer processor;
   a printing device operatively connected to the computer processor; and
   an input/output device operatively connected to the computer processor,
   wherein the processor is adapted to control the printing device to process a print job to produce printed output,
   wherein the processor is adapted to control the input/output device to output signals to, and receive signals from, finishing equipment to perform two-way data communications between the printing device and the finishing equipment,
   wherein the finishing equipment is adapted to manipulate the printed output,
   wherein the printing device uses the two-way data communications to provide an inquiry from the printing device to the finishing equipment as to which communication protocols/formats the finishing equipment is capable of understanding to establish a finisher-specific communication format to provide a single point user interface for supplying all print and finishing details to the printing device and the finishing equipment,
   wherein the processor is adapted to cause the signals to include an initial signal indicating a start of a data transfer and subsequent signals following the initial signal, and
   wherein the processor is adapted to cause the signals to be in the finisher-specific communication format.

2. The device according to claim 1, wherein the subsequent signals comprise data of sheet dimensions, an initial sheet speed, and a revised sheet speed.

3. The device according to claim 1, wherein the subsequent signals comprise data of printing faults.

4. The device according to claim 1, wherein the input/output device is adapted to receive data from the finishing equipment.

5. The device according to claim 1, wherein the input/output device is adapted to receive data from the finishing equipment indicating finishing equipment status.

6. The device according to claim 1, wherein the input/output device is adapted to receive data from the finishing equipment indicating finishing equipment faults.

7. The device according to claim 1, wherein the finishing equipment comprises stackers, staplers, sorters, and binding equipment.

8. A device comprising:
   a computer processor;
   a printing device operatively connected to the computer processor; and
   an input/output device operatively connected to the computer processor,
   wherein the processor is adapted to control the printing device to process a print job to produce printed output,
   wherein the processor is adapted to control the input/output device to output signals to, and receive signals from, finishing equipment to perform two-way data communications between the printing device and the finishing equipment,
   wherein the finishing equipment is adapted to manipulate the printed output,
   wherein the printing device uses the two-way data communications to provide an inquiry from the printing device to the finishing equipment as to which communication protocols/formats the finishing equipment is capable of understanding to establish a finisher-specific communication format to provide a single point user interface for supplying all print and finishing details to the printing device and the finishing equipment,
   wherein the processor is adapted to cause the signals to include an initial signal indicating a start of a data transfer and subsequent signals following the initial signal,
   wherein the processor is adapted to cause the signals to be in the finisher-specific communication, and
   wherein the subsequent signals comprise data of sheet dimensions and sheet speed.

9. The device according to claim 8, wherein the subsequent signals comprise data of a revised sheet speed.

10. The device according to claim 8, wherein the subsequent signals comprise data of printing faults.

11. The device according to claim 8, wherein the input/output device is adapted to receive data from the finishing equipment.

12. The device according to claim 8, wherein the input/output device is adapted to receive data from the finishing equipment indicating finishing equipment status.

13. The device according to claim 8, wherein the input/output device is adapted to receive data from the finishing equipment indicating finishing equipment faults.

14. The device according to claim 8, wherein the finishing equipment comprises stackers, staplers, sorters, and binding equipment.

15. A method comprising:
    processing a print job to produce printed output using a printing component of a device;
    controlling an input/output device of the device to output signals to, and receive signals from, finishing equipment to perform two-way data communications between the printing component and the finishing equipment, wherein the finishing equipment is adapted to manipulate the printed output;
    providing an inquiry from the printing component to the finishing equipment as to which communication protocols/formats the finishing equipment is capable of understanding using the two-way data communications to establish a finisher-specific communication format to provide a single point user interface for supplying all print and finishing details to the printing device and the finishing equipment;
    causing, using a processor of the device, the signals to include an initial signal indicating a start of a data transfer and subsequent signals following the initial signal; and
    causing the signals to be in the finisher-specific communication format using the processor.

16. The method according to claim 15, further comprising causing the signals to comprise data of sheet dimensions, an initial sheet speed, and a revised sheet speed using the processor.

17. The method according to claim 15, further comprising causing the signals to comprise data of printing faults using the processor.

18. The method according to claim 15, further comprising receiving data from the finishing equipment using the input/output device.

19. The method according to claim 15, further comprising receiving data from the finishing equipment indicating finishing equipment status using the input/output device.

20. The method according to claim 15, further comprising receiving data from the finishing equipment indicating finishing equipment faults using the input/output device.

* * * * *